United States Patent [19]
Scholz et al.

[11] Patent Number: 6,028,831
[45] Date of Patent: *Feb. 22, 2000

[54] LOADING MECHANISM FOR LOADING AND UNLOADING AN INFORMATION DISC INTO/FROM AN INFORMATION-TECHNOLOGY APPARATUS

[75] Inventors: Thomas Scholz, Waldernbach; Harald Noordhoek, Wetzlar; Marc Gielkens, Braunfels, all of Germany

[73] Assignee: U.S. Phillips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,186

[22] Filed: May 2, 1997

[30] Foreign Application Priority Data

May 2, 1996 [EP] European Pat. Off. ............... 96201215
Jul. 3, 1996 [DE] Germany ............................ 196 26 759

[51] Int. Cl.[7] .................................................. G11B 33/02
[52] U.S. Cl. .......................................... 369/75.2; 369/77.1
[58] Field of Search .................................. 369/75.2, 77.1, 369/36, 204, 178, 192

[56] References Cited

U.S. PATENT DOCUMENTS

| | | | |
|---|---|---|---|
| 5,163,040 | 11/1992 | Hake | 369/178 |
| 5,544,148 | 8/1996 | Nakamichi | 369/192 |
| 5,748,596 | 5/1998 | Nakamichi | 369/77.1 |

*Primary Examiner*—George J. Letscher
*Attorney, Agent, or Firm*—David R. Treacy

[57] ABSTRACT

Loading mechanism for loading and unloading an information disc into or from an information-technology apparatus in which first and second guides have respective first and second grooves each provided for engaging the edges of the information disc, and the second guide includes a rotationally drivable transport wheel which rolls the information disc into and out of the apparatus along a loading plane for the purpose of loading and unloading, and the first guide and the second guide are supported so as to be movable, and the first groove and second groove each have respective pressure faces inclined relative to the loading plane, and the first and second grooves each having a circumferential bottom surface and a minimum gap dimension where the respective circumferential bottom surfaces each extend substantially perpendicularly to the loading plane, and the respective minimum gap dimensions are each selected to be smaller than the thickness of the information disc, and wherein, during the loading process, the circumferential rim surface of the information disc is kept out of contact with the respective circumferential bottom surfaces of the guide grooves.

20 Claims, 6 Drawing Sheets

LOADING MECHANISM FOR LOADING AND UNLOADING AN INFORMATION DISC INTO/FROM AN INFORMATION-TECHNOLOGY APPARATUS

BACKGROUND OF THE INVENTION

The invention relates to a loading mechanism for loading and unloading an information disc into/from an information-technology apparatus, a first guide and a second guide each having a groove being provided for the disc edge, the second guide comprising a rotationally drivable transport wheel which rolls the information disc into and out of the apparatus for the purpose of loading and unloading.

Such a loading mechanism is known from U.S. Pat. No. 5,163,040. In this known loading mechanism the information disc is guided at one side by a rigid curved and grooved first guide member as a first guide and at the other side it is guided by a grooved transport wheel as a second guide. To introduce the information disc into the apparatus it is manually inserted into the loading slot of the apparatus and brought into engagement with the grooves of the first guide and the transport wheel. The transport wheel is motor driven during the loading process and the information disc is rolled into the apparatus between the transport wheel and the first guide along a curved loading path in the apparatus. The grooves of the first guide and the transport wheel are each V-shaped.

However, a construction of this kind has several disadvantages. Owing to the use of the curved first guide, the information disc can only be introduced into the apparatus only along a curved loading path via the first guide, insertion along a straight path, however, being impossible. As compared with straight-line insertion of the information disc this requires a larger width of the loading mechanism and hence of the apparatus. Particularly for automotive uses this is a considerable drawback, because the room available for mounting of the apparatus is then limited.

The information discs normally have a central positioning hole. In order to avoid damage to the disc surface, it is advantageous if a user touches the information disc only touched at the edge of the positioning hole and at the periphery of the information disc.

In the known arrangement the center of the information disc must be inserted by hand up to at least the location of the center of the transport wheel into the position referred to below as the intermediate position, before the loading mechanism proceeds to automatic insertion of the information disc. In this intermediate position the positioning hole is no longer situated outside the housing front and the user cannot hold the information disc in the desired manner at the edge of the positioning hole and at the periphery of the information disc. As a result, the user is forced to touch the information-disc surface in order to bring the information disc into the intermediate position. This leads to increased wear of the information discs.

SUMMARY OF THE INVENTION

It is an object of the invention to provide a loading mechanism of the type defined in the opening paragraph, which has minimal dimensions and which enables the information disc to be loaded and unloaded without the surface of said disc being touched.

According to the invention this object is achieved in that the first guide and the second guide are supported so as to be movable, the groove of the first guide and the groove of the second guide each have pressure faces which are inclined relative to the loading plane, the groove of the first and the groove of the second guide each have a circumferential bottom surface extending substantially perpendicularly to the loading plane, and the respective minimum gap dimension has been selected to be smaller than the thickness of the information disc, in such manner that during the loading process the circumferential rim surface 2d of the information disc is not in contact with the circumferential bottom surfaces of the grooves.

The movability of the first guide and the second guide allows these guides to move in accordance with the outline of the information disc and thus guide the disc edge, which forms the border edge or boundary of each major surface of the information disc, of the information disc in a flexible manner. This enables the information disc to be loaded along substantially arbitrarily definable loading paths. Information discs not having a circular disc edge (for example having oval or other disc edges) can also be rolled into the apparatus by means of such a loading mechanism. A variety of constructions are conceivable in order to obtain the movability of the first guide and the second guide. For example, the first guide and the second guide can be guided in guide slots and can be urged against the disc edge of the information disc in these guide slots by spring force or by means of actuators. Moreover, the first guide and the second guide can be arranged on pivotal arms which are supported at one end.

The grooves of the first and the second guide are substantially U-shaped, at least one limb being inclined relative the loading plane and consequently has at least one inclined pressure face for the information disc. The loading plane is defined as the plane in which the information disc is rolled into apparatus by means of the first and the second guide. During the loading process the first and the second guide are pressed against the edge of the information disc. The force exerted on the surface of the information disc by means of the inclined pressure faces is then directed perpendicularly to the loading plane. The inner groove height, i.e. the height of the groove at the inner circumferential surface of the groove, has been selected smaller than the thickness of the information disc. If the loading mechanism is to be used for loading or unloading information discs of different thicknesses into/from an information-technology apparatus, the minimum gap dimension is selected to be smaller than the thickness of the thinnest information disc. Thus, it is achieved that the outer edge of the information disc does not touch the circumferential bottom surfaces of the grooves during loading. The information disc is only in point contact with the grooves at the location of the inclined pressure faces.

In comparison with a V-shaped groove such a substantially U-shaped groove has the advantage that the angle of inclination of the pressure faces can be substantially smaller. This yields the advantage that the force applied to the surface of the information disc at the location of the pressure faces in a direction perpendicular to the loading plane is raised considerably. Moreover, the U-shaped groove can have a substantially smaller depth in the direction of the loading plane for the same thickness of the information disc.

A further advantageous embodiment of the invention is characterized in that the groove of the first guide and the groove of the second guide each have a pressure face which is inclined relative to the loading plane at the upper side and at the lower side of the groove.

With a groove of this shape it is possible to exert a force directed perpendicularly to the loading plane on the surface of the information disc both from the top by means of pressure face at the upper side and from beneath by means of the pressure face at the lower side.

A further advantageous embodiment of the invention is characterized in that the information disc is clamped in the grooves of the first guide and the second guide.

The loading mechanism in accordance with the invention enables such a clamping action to be realized in a satisfactory manner owing to the substantially U-shaped groove. Since a very small angle of inclination can be chosen for the pressure faces the force which can be applied to the surface of the information disc at the location of the pressure faces in a direction perpendicular to the loading plane is very large and an effective clamping action can be obtained.

In a further advantageous embodiment of the invention in an eject position the information disc is clamped in the grooves of the first guide and the second guide in such a manner that a user should exert a minimum force of 0.7 N (Newtons) to pull said information disc out of the grooves by hand.

In the eject position the first guide and the second guide press against the surface of the information disc with their pressure faces and hold the disc firmly, thus preventing the information disc from inadvertently rolling out of the apparatus. To remove the information disc from the apparatus the user must pull the information disc out of the grooves of the first and the second guide with a minimum force of 0.7 N. Such a minimum force is particularly advantageous when the loading mechanism is used in an information-technology apparatus in a motor vehicle. Such a minimum force then assures that the information disc neither comes out of the apparatus in the case of shocks during driving, for example as a result of a bumpy road.

A further advantageous embodiment of the invention is characterized in that the first guide comprises a supporting segment. In an advantageous variant of this embodiment the angles of inclination of the pressure faces of the first guide lie in a range between 4° and 8°, thus defining an included angle between 8° and 16°, and the angles of inclination of the pressure faces of the second guide lie in a range between 3° and 7°, thus defining an included angle between 5° and 14°.

Selecting such angles of inclination for the pressure faces has proved to be very advantageous. If the angle of inclination of the pressure faces is greater than 7° and 8°, respectively, the normal force which can be exerted on the surface of the information disc at the location of the pressure faces is very small. If the angle of inclination is selected to be smaller than 3° and 4°, respectively, the loading mechanism becomes very sensitive to tolerances of the thickness of the information disc for a given radial groove depth.

It is advantageous to select the angle of inclination of the pressure faces of the supporting segment to be greater than the angle of inclination of the pressure faces of the transport wheel because the transport wheel drives the information disc actively, while the supporting segment provides passive support.

A further advantageous embodiment of the invention is characterized in that the first guide comprises a rotationally drivable transport wheel.

If both the first guide and the second guide comprise a rotationally drivable transport wheel it is possible to move the information disc into and out of the apparatus without the information disc itself then being rotated. If the geometrical dimensions of the groove of the transport wheel of the first guide and the groove of the transport wheel of the second guide are exactly the same, the information disc will be moved into and out of the apparatus without self-rotation when the transport wheel of the first guide and the transport wheel of the second guide are rotated in opposite directions with the same speed of rotation.

A further advantageous embodiment of the invention is characterized in that the modulus of elasticity of the surfaces of the pressure faces is greater than the modulus of elasticity of the information disc, the surfaces of the pressure faces have such a roughness and the information disc is pressed against the pressure faces of the groove with such a force that a frictional engagement exists between the surface of the information disc and the pressure faces during the loading process.

In this advantageous embodiment of the invention the surface has a given roughness. Since the modulus of elasticity of the surface is greater than the modulus of elasticity of the information disc the surface of the information disc partly interengages with the rough pressure faces, thereby establishing a frictional engagement between the surface of the information disc and the pressure faces.

A further advantageous embodiment of the invention is characterized in that the basic material of the transport wheel is steel and the steel is covered with a layer of chromium-carbide at least at the location of the pressure faces.

The basic profile of the transport wheel can, for example, be turned from a steel. This turned steel transport wheel is provided with a layer of chromium-carbide at the location of each of the pressure faces. Chromium-carbide has a very high hardness, which in the case of a suitable composition can reach values of over 800 DPN (diamond pyramid hardness number). The modulus of elasticity of chromium-carbide is very large and values of over 300 GPa can be attained. Moreover, chromium-carbide has a very good adhesion to polycarbonate, of which information discs manufactured in accordance with the Compact Disc standard are made.

The high hardness of the chromium-carbide layer leads to a very low wear of both the chromium-carbide layer and the surface of the information disc. Owing to the good adhesion between chromium-carbide and polycarbonate very large static friction forces occur between the surface of the information disc and the chromium-carbide pressure faces, as a result of which large traction and holding forces can be applied in the direction of the loading plane. By means of the large modulus of elasticity of the chromium-carbide layer it is achieved that the surface of the information disc partly interengages with the rough surface of the chromium-carbide layer, thereby establishing a frictional engagement.

A further advantageous embodiment of the invention is characterized in that the basic material of the transport wheel is steel and the steel is covered with a layer of tungsten-carbon-hydrogen at least at the location of the pressure faces.

The basic profile of the transport wheel can, for example, be turned from a steel. This turned steel transport wheel is provided with a layer of tungsten-carbon-hydrogen at the location of each of the pressure faces. Tungsten-carbon-hydrogen has a very high hardness, which in the case of a suitable composition can reach values of over 800 DPN. The modulus of elasticity of tungsten-carbon-hydrogen is very large and values of over 300 GPa can be attained. Moreover, tungsten-carbon-hydrogen has a very good adhesion to polycarbonate, of which information discs manufactured in accordance with the Compact Disc standard are made.

The high hardness of the tungsten-carbon-hydrogen layer leads to a very low wear of both the tungsten-carbon-hydrogen layer and the surface of the information disc. Owing to the good adhesion between tungsten-carbon-hydrogen and polycarbonate very large static friction forces occur between the surface of the information disc and the pressure faces of tungsten-carbon-hydrogen, as a result of which large traction and holding forces can be applied in the direction of the loading plane. By means of the large modulus of elasticity of the tungsten-carbon-hydrogen layer it is achieved that the surface of the information disc partly interengages with the rough surface of the tungsten-carbon-hydrogen layer, thereby establishing a frictional engagement.

A further advantageous embodiment of the invention is characterized in that the basic material of the first guide is steel and the steel is covered with a layer of chromium-carbide or tungsten-carbon-hydrogen at least at the location of the pressure faces.

With such a structure the advantageous characteristics of the chromium-carbide or the tungsten-carbon-hydrogen layer are utilized both for the first guide and for the second guide.

In a further advantageous embodiment of the invention the maximum surface roughness $R_t$ of the pressure faces lies in a range between 2 $\mu$m and 15 $\mu$m and the average arithmetical roughness $R_a$ lies in a range between 0.2 $\mu$m and 1.5 $\mu$m.

If the average arithmetical roughness $R_a$ becomes greater than 1.5 $\mu$m, the surface roughness is distributed too non-uniformly and the force applied to the surface of the information disc by means of the pressure faces is subject to local fluctuations. This can lead to a non-uniform roll-in of the information disc, particularly to stick-slip effects. If the maximum surface roughness $R_t$ of the pressure faces exceeds 15 $\mu$m, this gives rise to a substantial wear of the surface of the information disc and the surface coating of the information disc will be abraded. If the maximum surface roughness $R_t$ of the pressure faces is smaller than 2 $\mu$m, the static friction between the pressure faces and the surface of the information disc becomes very small, as a result of which the force which can be applied to the information disc in the loading plane can become too small.

Suitably, the chromium-carbide layer or the tungsten-carbon-hydrogen layer is deposited by means of a vapor deposition process. Such a vapor deposition process has the advantage that the chromium-carbide or the tungsten-carbon-hydrogen adapts itself to the surface structure of the steel. If at the location of the pressure faces the steel has been given the desired surface roughness, this surface roughness will be maintained upon the vapor deposition of the chromium-carbide layer or the tungsten-carbon-hydrogen layer. As vapor deposition process for the chromium-carbide layer a CVD process (Chemical Vapor Deposition) is particularly suitable and as vapor deposition process for the tungsten-carbon-hydrogen layer a PVD process (Physical Vapor Deposition) is particularly suitable.

The loading mechanism in accordance with the invention can be used advantageously used in a deck, in an information-technology apparatus including a deck, or in a car radio including a deck.

BRIEF DESCRIPTION OF THE DRAWINGS

Some embodiments of the invention will be described in more detail hereinafter, by way of examples, with reference to FIGS. 1 to 8 of the drawings. In the drawings.

DETAILED DESCRIPTION OF THE PREFERRED EMBODIMENTS

Figure 1:
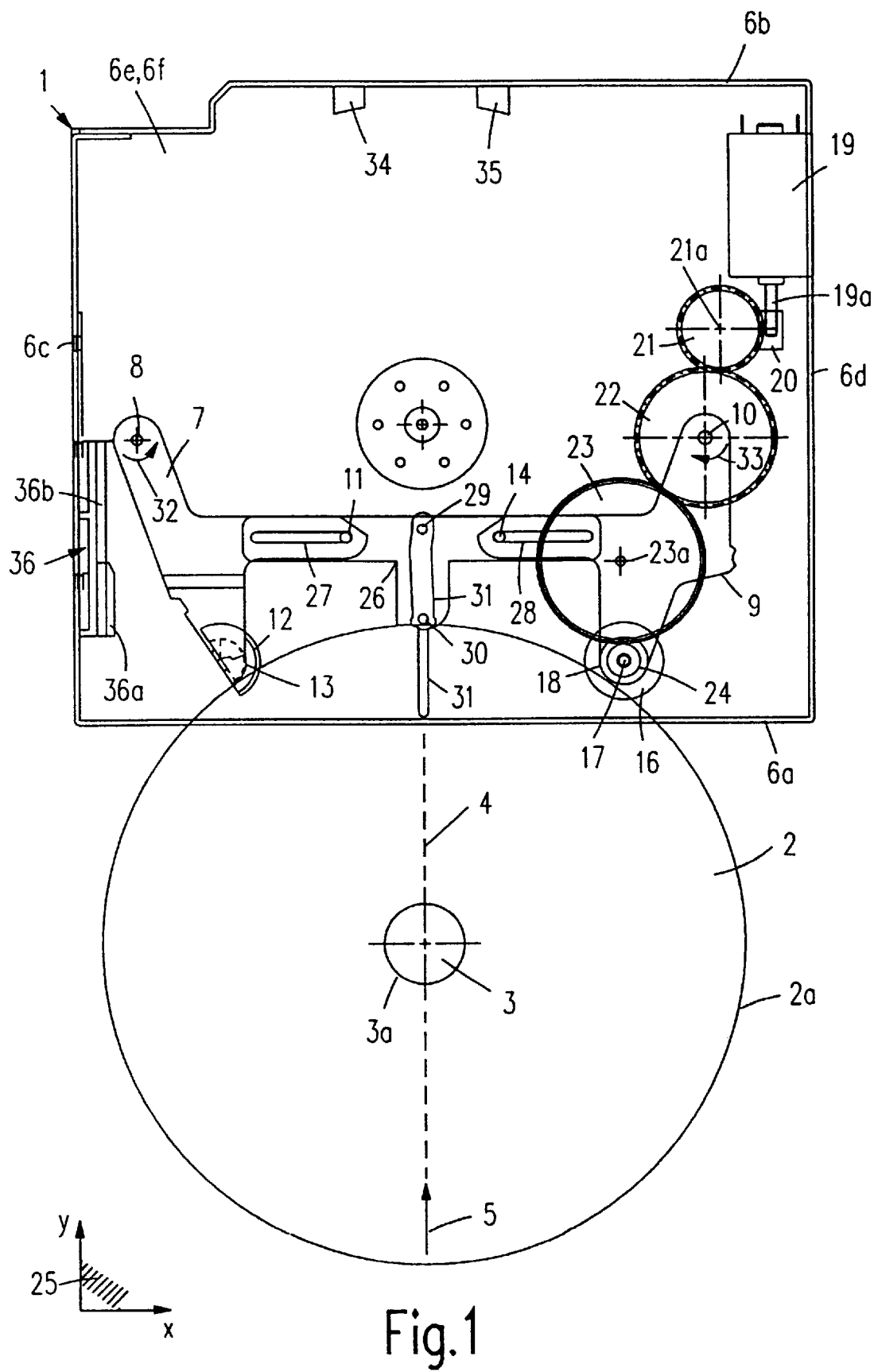
FIG. 1 shows in a plan view a first embodiment of the loading mechanism for loading and unloading an information disc into/from an information-technology apparatus, the loading mechanism comprising a grooved supporting segment as the first guide and a grooved transport wheel as the second guide for the edges of the information disc and being in an eject position, in which the information disc is clamped in the grooves and is held in a stable manner by the guides, enabling it to be removed by hand by a user.

FIG. 1 shows a first embodiment of a loading mechanism in accordance with the invention in the eject position. The loading mechanism is accommodated in a housing 1. The loading mechanism serves for moving an information disc 2 into the housing 1 along a linear loading path 4 in a first loading direction 5 and for moving out the information disc 2 along the linear loading path 4 in a direction opposed to the first loading direction 5. The information disc 2 has a circular edge 2*a*, which forms the border edge or boundary of each major surface 2*b*, 2*c* (see FIG. 7) of the information disc, and has a circular positioning hole 3 with an edge 3*a*. The housing 1 has a front wall 6*a*, a rear wall 6*b*, side walls 6*c* and 6*d*, as well as a bottom plate 6*e* and a housing cover 6*f*. A pivotal spindle 8 is mounted on the bottom plate 6*e* in the proximity of the side wall 6*c*, about which spindle a first pivotal arm 7 is pivotable. A spindle 10 is mounted on the bottom plate 6*e* in the proximity of the side wall 6*d*, about which spindle a second pivotal arm 9 is pivotable. The first pivotal arm 7 carries an arm pivot 11 and a supporting segment 12 having a groove 13 as the first guide. The second pivotal arm 9 carries an arm pivot 14. A transport wheel 16 is mounted on the second pivotal arm 9 so as to be pivotable about a spindle 17. The transport wheel 16 has a groove 18. A motor 19, whose shaft 19a carries a worm 20, is mounted on the bottom plate 6e of the housing 1. The motor 19 can be driven in two directions. By means of the worm 20 a toothed wheel 21 can be driven, which toothed wheel is rotatably mounted on a spindle 21a carried by the bottom plate 6e. The toothed wheel 21 is in mesh with a toothed wheel 22, which is rotatably mounted on the spindle 10 of the second pivotal arm 9. The second toothed wheel 22 is in mesh with a third toothed wheel 23, which is rotatably mounted on a spindle 23a on the second pivotal arm 9. The third toothed wheel 23 meshes with a toothed ring 24 on the transport wheel 16. Thus, the transport wheel 16 can be driven in two directions by means of the motor 19, the motor shaft 19a, the worm wheel 20, the first toothed wheel 21, the second toothed wheel 22 and the third toothed wheel 23.

A T-shaped coupling rod 26 has a first coupling-rod groove 27, which extends perpendicularly to the first loading direction 5, a second coupling-rod groove 28, which extends perpendicularly to the first loading direction 5, a first coupling-rod pin 29 and a second coupling-rod pin 30. The first coupling-rod pin 29 and the second coupling-rod pin 30 engage a housing-cover groove 31 formed in the housing cover 6f and extending in the first loading direction 5. The arm pivot 11 of the first pivotal arm 7 engages the first coupling-rod groove 27 and the arm pivot 14 of the second pivotal arm 9 engages the second coupling-rod groove 28.

The first pivotal arm 7 is pretensioned in the direction indicated by an arrow 32 about the pivotal spindle 8 by means of a spring, not shown. The second pivotal arm 9 is pretensioned in the direction indicated by an arrow 33 about the pivotal spindle 10 by means of a spring, not shown. It is also possible to pretension only one of the two pivotal arms.

The rear wall 6b of the housing 1 carries two stops 34 and 35.

The side wall 6c of the housing 1 carries an auxiliary guide 36. This auxiliary guide 36 has a lower supporting surface 36a, which extends in a loading plane 25, and an upper guide surface 36b, which extends in the loading plane 25. The loading plane is the plane in which the information disc 2 is moved into the apparatus in the first loading direction 1 and is defined by the coordinate axes X-Y in FIG. 1. The upper guide surface 36b is longer than the lower supporting surface 36a in the first loading direction 5.

In the eject position shown in FIG. 1 the user has brought the information disc 2 by hand into engagement with the groove 13 of the supporting segment 12 and the groove 18 of the transport wheel 16. For this purpose, the user holds the information disc 2 by the edge 2a of the disc 2 and by the edge 3a of the positioning hole 3. The information disc 2 thus held is moved from the eject position shown in FIG. 1 into the intermediate position shown in FIG. 2. During this movement from the eject position shown in FIG. 1 into the intermediate position shown in FIG. 2 the first pivotal arm 7 is pivoted about the spindle 8 and the second pivotal arm 9 is pivoted about the spindle 10. The pivoting force required for this is exercised by the user. The information disc 2 is then laterally guided by the groove 13 of the supporting segment 12 at one side and by the groove 18 of the transport wheel 16 at the other side. The user does not touch the surface of the information disc 2.

Figure 2:
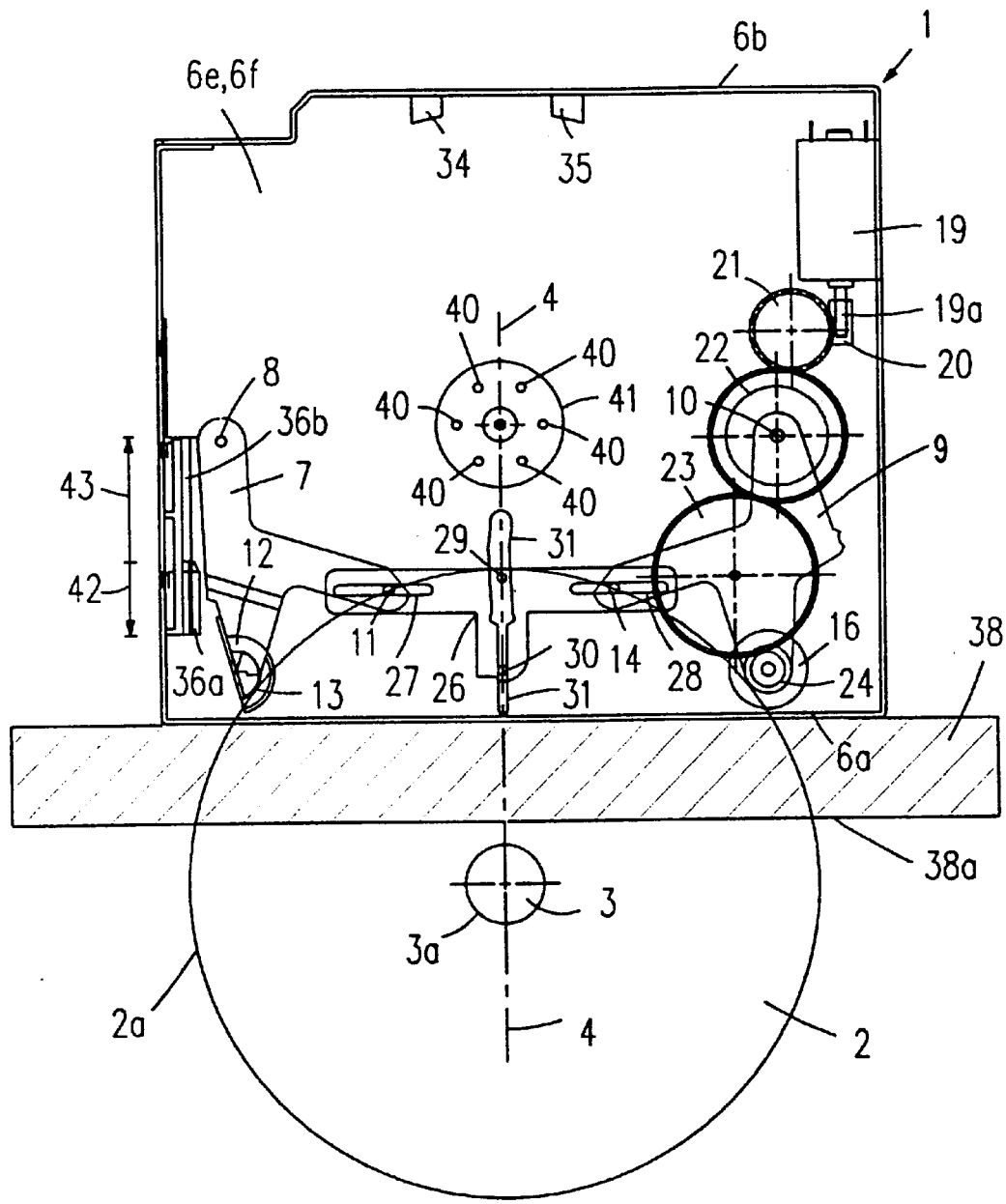
FIG. 2 shows the loading mechanism of FIG. 1 in an intermediate position in which the user has inserted the information disc up to a point at which the loading mechanism automatically proceeds with the loading process of the information disc.

In the intermediate position of the loading mechanism shown in FIG. 2 the information disc 2 projects from the front 6a of the housing 1 of the loading mechanism over approximately ⅔ of its diameter. As is shown in FIG. 2, it is possible to mount a control panel 38 on the front wall 6a of the housing 1. This control panel 38 can be, for example, the control panel of a car radio that incorporates an apparatus for recording and/or reproducing information on/from the information disc 2. The positioning hole 3 of the information disc 2 projects from the front side 38a of the control panel 38. Consequently, the user can also hold the information disc 2 by the edge 3a of the positioning hole 3 and by the edge 2a of the information disc 2 in this intermediate position.

When the user has inserted the information disc 2 by hand into the housing 1 up to the intermediate position, the motor 19 is energized via a switch, not shown, and the loading mechanism automatically completes the loading process.

The switch can be, for example, a mechanical switch or an optical switch (light barrier). It is also possible to start the motor already at an earlier instant.

Figure 3:
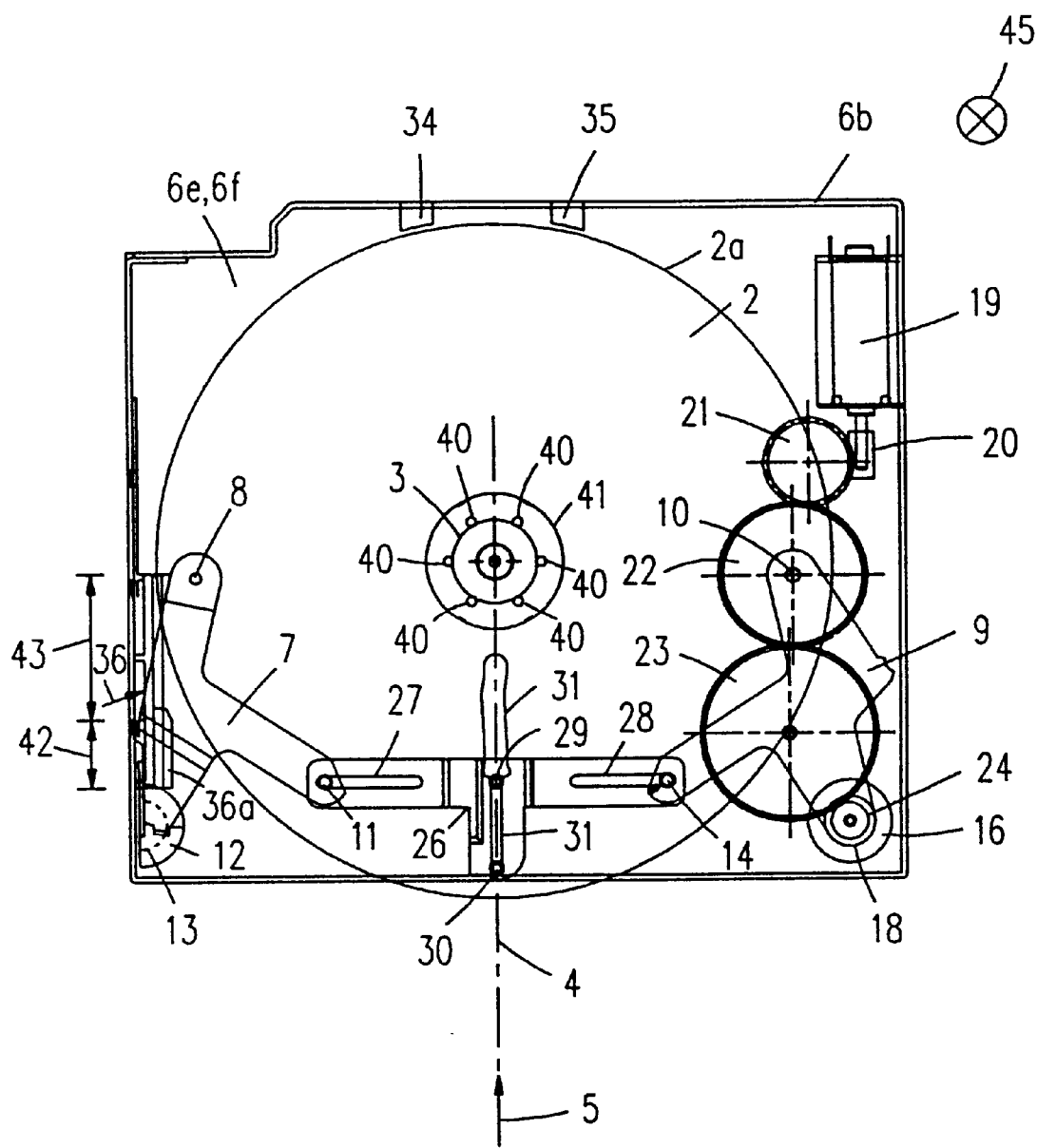
FIG. 3 shows the loading mechanism of FIG. 1 in a roll-in position with an information disc wholly rolled-in in a first loading direction.

The motor 19 now begins to rotate so as to drive the transport wheel 16 clockwise via the motor shaft 19a, the worm 20, the first toothed wheel 21, the second toothed wheel 22 and the third toothed wheel 23. The transport wheel 16, which rotates clockwise, then exerts a tangential force on the edge 2a of the information disc 2, as a result of which the information disc 2, which is supported between the supporting segment 21 and the transport wheel 16, is automatically rolled into the housing 1 along a straight loading path 4. The first pivotal arm 7 is then pivoted about the spindle 8 and the second pivotal arm 9 about the spindle 10. As shown in FIGS. 1–3, the supporting segment 12 pivots with the arm 5, so that the tangential force exerted by wheel 16 is effective to roll the information disc 2 along the path 4.

FIG. 3 shows the loading mechanism in a roll-in position, in which the information disc 2 has been moved up to the stops 34 and 35 in the first loading direction 5. The pivotal arms 7 and 9 have been pivoted away from the disc edge 2a by means of the transport wheel 16 and the supporting segment 12 and the lower supporting surface 36a of the auxiliary guide 36 no longer acts upon the information disc 2, so that by means of a lowering mechanism, not shown, this information disc can be lowered with its positioning hole 3 onto a clamping device 40 of a turntable 41, shown in the Figure, into a play position, not shown. In this play position, not shown, the information disc 2 can be rotated by means of the turntable 41, which is drivable by drive means, not shown, and the information stored on the information disc 2, for example music information, can be reproduced.

The transfer from the intermediate position shown in FIG. 2 to the roll-in position shown in FIG. 3 will be described in detail hereinafter.

The transport wheel 16, which rotates clockwise, exerts a tangential force on the edge 2a of the information disc 2, as a result of which the information disc 2, which is supported between the supporting segment 12 and the transport wheel 16, is rolled into the housing 1 along a straight loading path 4 in the first loading direction 5. During the movement from the intermediate position to the play position the edge 2a of the information disc 2 is partly guided by the auxiliary guide 36, which as a third guide in addition to the supporting segment 12 forming the first guide and the transport wheel 16 forming the second guide ensures a better guidance of the information disc 2. In a first part 42 of the auxiliary guide 36, indicated in FIGS. 2 and 3, the edge of the information disc 2 is then guided both by the lower supporting surface 36a of the auxiliary guide 36 and by the upper guide surface 36b of the auxiliary guide 36. In a second part 43 of the auxiliary guide 36 the information disc 2 is guided only by the upper guide surface 36b of the auxiliary guide 36. During the movement of the information disc 2 in the first loading direction 5 rolling-in along the straight loading path 4 is achieved in that the first coupling-rod pin 29 and the second coupling-rod pin 30 are guided in the first loading direction 5 in the housing-cover groove 31. The loading process in the first loading direction 5 is terminated in that the information disc 2 abuts against stops 34 and 35 on the rear wall 6b of the housing 1. Once the information disc 2 has been moved against the stops 34 and 35 in the first loading direction 5, a drive mechanism, not shown, is activated in a manner, not shown, which mechanism acts upon the first pivotal arm 7 in such a manner that this arm is pivoted clockwise about the pivotal spindle 8, and upon the second pivotal arm 9 in such a manner that this arm is pivoted counter-clockwise about the spindle 10. As a result, the groove 18 of the transport wheel 16 and the groove 13 of the supporting segment 12 are disengaged from the edge 2a of the information disc 2. In this position the information disc 2 is no longer guided by the lower supporting surface 36a of the auxiliary guide 86. This enables the information disc 2 to be lowered onto the clamping device 40 of the turntable 41 in a manner, not shown, by a lowering mechanism, not shown, in a second loading direction 45 perpendicular to the loading plane 25. The unloading process is exactly the inverse of the loading process.

Figure 4:
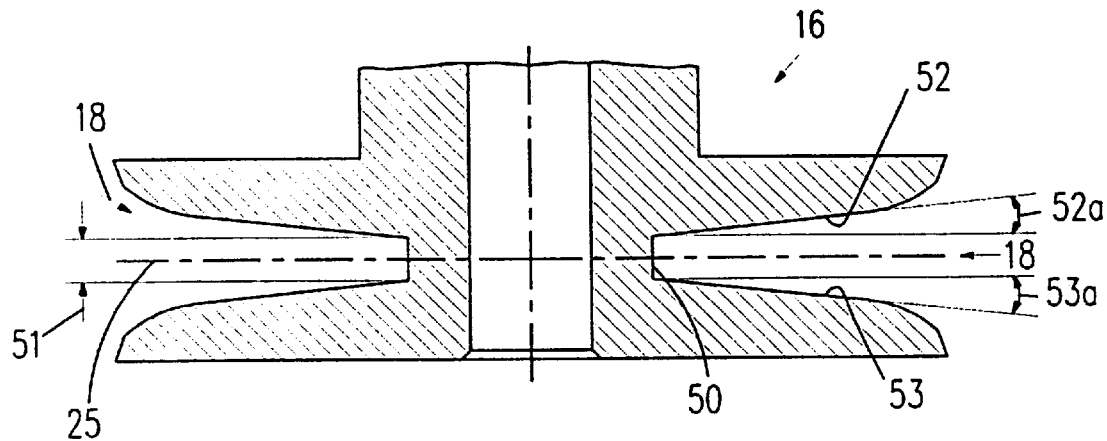
FIG. 4 is a sectional view of a transport wheel of the second guide, the basic material of the transport wheel being steel.

FIG. 4 is a sectional view of a first example of the transport wheel 16. The transport wheel 16 is made of steel and has the circumferential groove 18. The circumferential groove 18 has a circumferential bottom surface 50. At its inner circumferential bottom surface 50 the groove 18 has an inner groove or minimum gap dimension 51. The circumferential groove 18 has a pressure face 52 at its upper side and a pressure face 53 at its lower side. The pressure face 52 has an angle of inclination 52a relative to the loading plane 25 and the pressure face 53 has an angle of inclination 53a relative to the loading plane 25. Thus the pressure faces 52 and 53 are conical, and the faces 52 and 53 and bottom surface 50 are surfaces of revolution about the wheel axis. The groove 18 of the transport wheel 16 with the inclined pressure faces 52 and 53 and the inner circumferential bottom surface 50 is substantially U-shaped.

Figure 5:
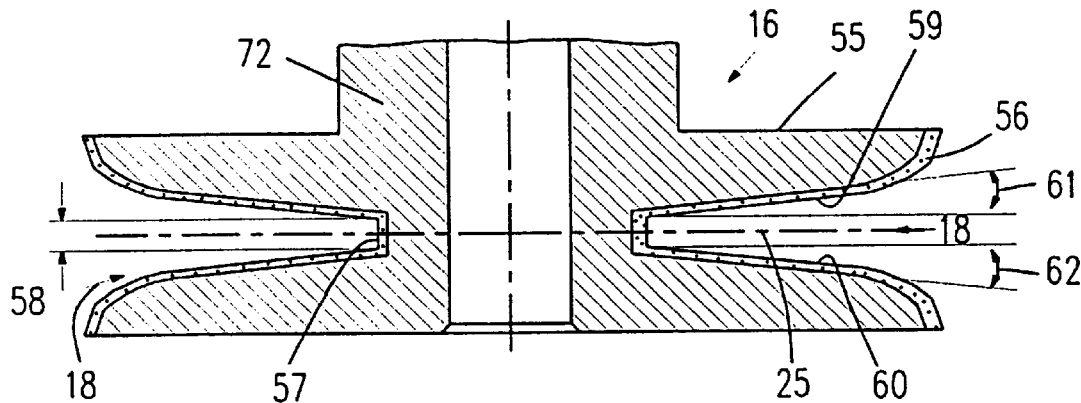
FIG. 5 is a sectional view of the transport wheel of the second guide, the basic material of the transport wheel being steel and the steel being covered with a chromium-carbide layer at the location of the groove.

FIG. 5 is a sectional view of a second example of the transport wheel 16. The transport wheel 16 comprises a basic element 72 made of steel. The basic profile 55 of the basic element 72 can be made of a crude steel, for example by turning. The steel basic profile 55 of the basic element 72 is covered with a layer 56 of chromium-carbide at the location of the groove 18. The chromium-carbide layer 56 can be applied, for example, by means of a vapor deposition process. A possible vapor deposition process is the CVD process (Chemical Vapor Deposition). The vapor-deposited chromium-carbide layer 56 extends parallel to the basic profile 55. The circumferential groove 18 has an inner circumferential surface 57 having an inner groove or minimum gap dimension 58. The circumferential groove 18 has an inclined pressure face 59 at its upper side and an inclined pressure face 60 at its lower side. The inclined pressure face 59 has an angle of inclination 61 relative to the loading plane 25 and the inclined pressure face 60 has an angle of inclination 62 relative to the loading plane 25.

It is possible to use a tungsten-carbon-hydrogen layer as an alternative to the vapor-deposited chromium-carbide layer 56.

Figure 6:
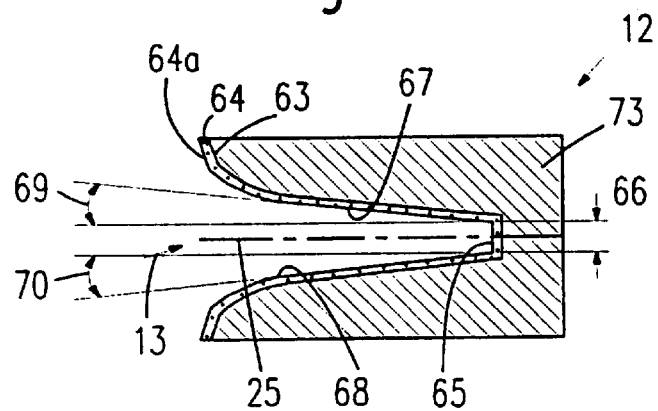
FIG. 6 is a sectional view of the supporting segment of the first guide, the basic material of the supporting segment being steel and the steel being covered with a chromium-carbide layer at the location of the groove, FIG. 7 basically illustrates the cooperation of the supporting segment of the first guide and the transport wheel of the second guide with the information disc during the loading process, the information disc being clamped in the grooves of the transport wheel and the supporting segment but not being in contact with the inner sides of the grooves.

FIG. 6 is a sectional view of the supporting segment 12. The supporting segment 12 comprises a basic element 73 made of steel and having a basic profile 63. This basic profile 63 is covered with a layer 64 of chromium-carbide at the location of the groove 13. The circumferential groove 13 of the supporting segment 12 has an inner circumferential bottom surface 65 having an inner groove or minimum gap dimension 66. The chromium-carbide layer 64 has been applied, for example, by means of a vapor deposition process and extends parallel to the basic profile 63 of the steel. The groove 13 has an inclined pressure face 67 at its upper side and an inclined pressure face 68 at its lower side. The inclined pressure face 67 has an angle of inclination 69 relative to the loading plane 25 and the inclined pressure face 68 has an angle of inclination 70 relative to the loading plane 25. As is made clear from FIGS. 1–3, the pressure faces 67 and 68 are segments of cones, and the faces 67 and 68 and bottom surface 65 are surfaces of revolution partway around the segment axis.

Figure 7:
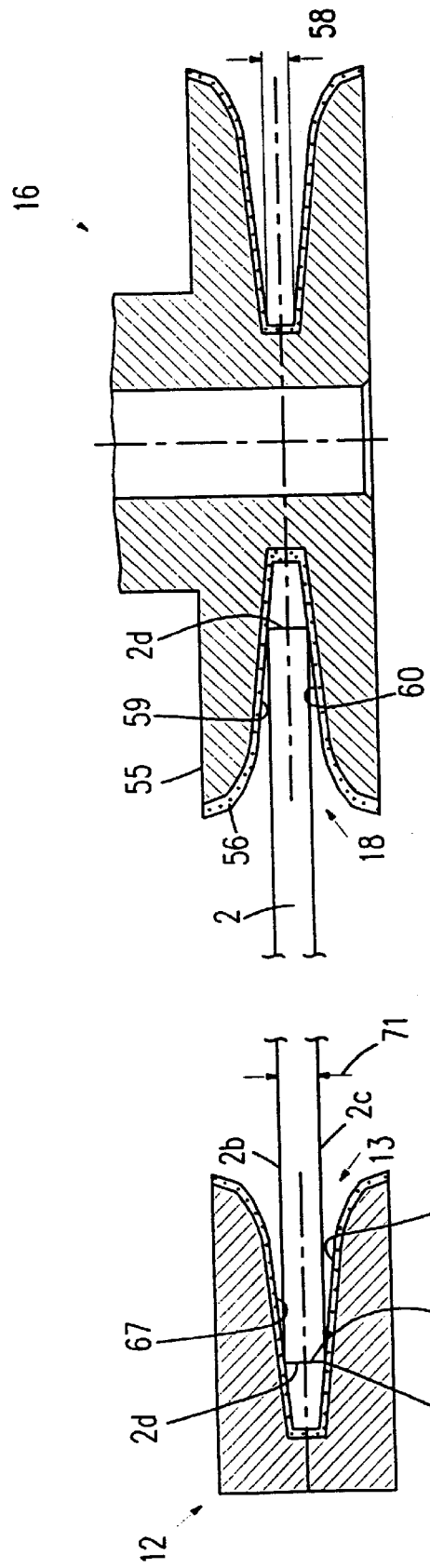

FIG. 7 basically illustrates the cooperation between the transport wheel 16 shown in FIG. 5, the supporting segment 12 shown in FIG. 6 and the information disc 2. The information disc 2 is made of polycarbonate and has a first major disc surface 2b, a second major disc surface 2c and a circumferential rim surface 2d. During the loading process the information disc 2 is clamped in the groove 18 of the transport wheel 16 and the groove 13 of the supporting segment 12. The first disc surface 2b of the information disc 2 engages against the pressure face 59 of the transport wheel 16 and against the pressure face 67 of the supporting segment 12. The second disc surface 2c of the information disc 2 engages against the pressure face 60 of the transport wheel 16 and against the pressure face 68 of the supporting segment 12. Owing to the inclination of the pressure faces 59 and 60 of the transport wheel 16 and of the pressure faces 67 and 68 of the supporting segment 12 the surfaces 2b and 2c of the information disc 2 and the pressure faces 59, 67 and 60, 68, respectively, are essentially in point contact at the location of the disc edge 2a. Normally, no information is stored on the information disc in the area of the disc edge 2a. The area of the information disc 2 in which information is stored is neither in contact with the groove 18 of the transport wheel 16 nor with the groove 13 of the supporting segment 12, which precludes damage to areas of the information disc 2 on which information is stored. During loading the circumferential rim surface 2d of the information disc 2 is neither touched by the inner circumferential bottom surface 57 of the transport wheel 16 nor by the inner circumferential bottom surface 65 of the supporting segment 12. The inner minimum gap dimension 58 of the transport wheel 16 and the minimum gap dimension 66 of the supporting segment 12 are selected to be smaller than the thickness 71 of the information disc 2.

The angles of inclination 61 and 62 of the respective pressure faces 59 and 60 of the transport wheel 16 are in a range between 3° and 7°. The angles of inclination 69 and 70 of the respective pressure faces 67 and 68 of the supporting segment 12 are in a range between 4° and 8°. Owing to these small angles of inclination high normal forces can be exerted on the surfaces 2b and 2c of the information disc 2 by means of the pressure faces 59, 60 and 67, 68, respectively. This provides an effective clamping action.

Chromium-carbide has a very high hardness, which in can reach values of over 800 DPN (diamond pyramid hardness number). The modulus of elasticity of chromium-carbide is very large and values of over 300 GPa can be attained. The high hardness of the chromium-carbide layer 56 of the transport wheel 16 and of the chromium-carbide layer 64 of the supporting segment 12 results in a very low wear of both the chromium-carbide layers 56 and 64 and of the major surfaces 2b and 2c of the information disc 2. Since chromium-carbide has a very good adhesion to polycarbonate very large static friction forces occur between the surfaces 2b and 2c of the information disc and the pressure faces 59, 60 and 67, 68, respectively. The modulus of elasticity of the chromium-carbide layers 56 and 64 is substantially larger than the modulus of elasticity of the polycarbonate information disc 2. As a result of this, it is achieved that the major surfaces 2b and 2c of the information disc 2 partly interengage with the pressure faces 59, 60 and 67, 68, respectively, thereby establishing a frictional engagement between the information disc 2 and the chromium-carbide layers 56 and 64. The maximum surface roughness $R_t$ of the pressure faces 59, 60 and 67, 68 lies in a range between 2 μm and 15 μm and the average arithmetical roughness $R_a$ lies in a range between 0.2 μm and 1.5 μm.

Owing to the inclined pressure faces 59, 60 and 67, 68 the loading mechanism is also capable of loading information discs 2 of different thicknesses 71.

Figure 8:
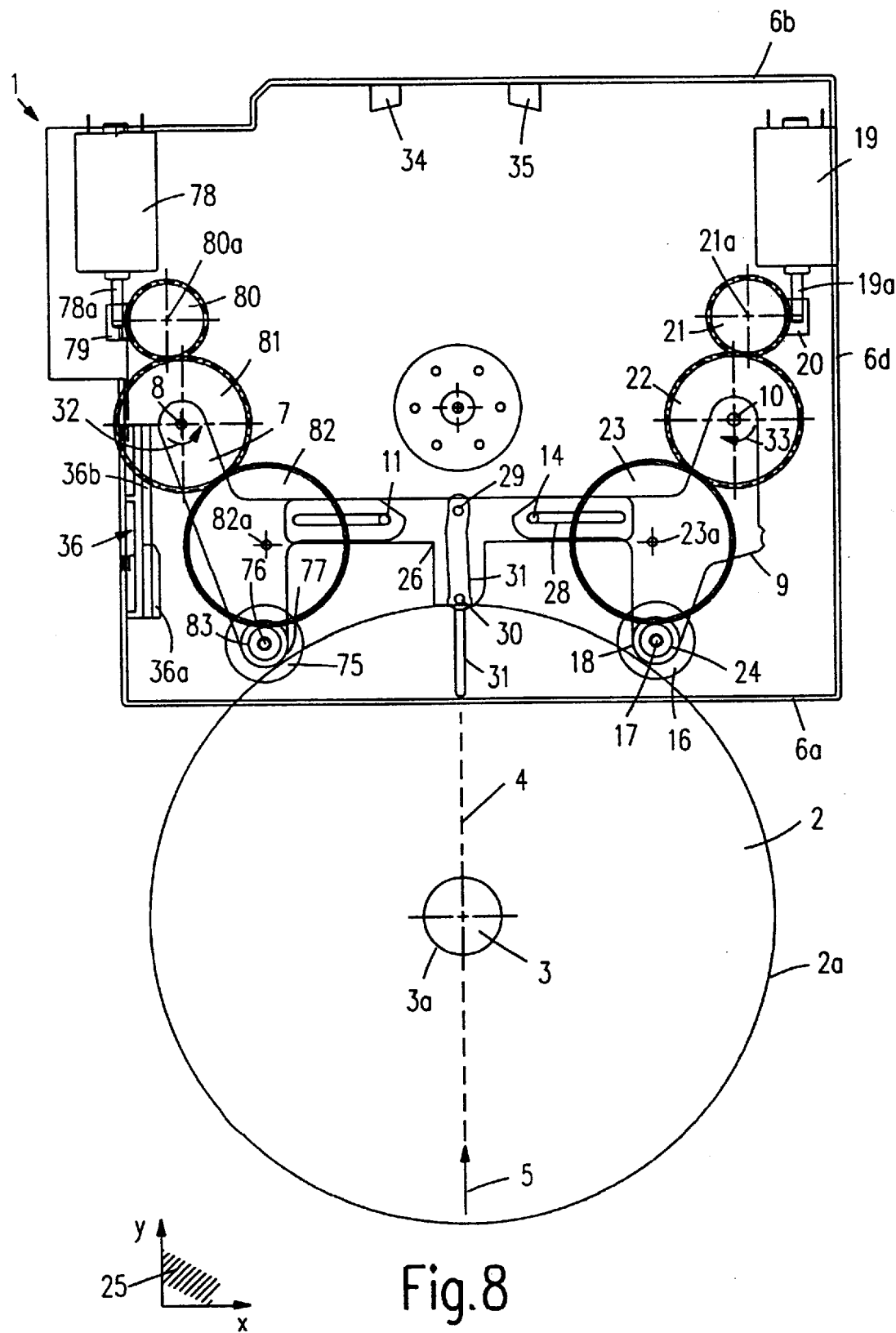
FIG. 8 shows in a plan view a second embodiment of the loading mechanism, both the first guide and the second guide comprising a grooved transport wheel and the loading mechanism being in an eject position, in which the information disc is clamped in the grooves and is held in a stable manner by the guides, enabling it to be removed by hand by a user.

FIG. 8 shows a second embodiment of the loading mechanism in the eject position. Apart from the construction of the first guide this second embodiment is identical to the first embodiment.

The first pivotal arm 7 carries a transport wheel 75 as the first guide, mounted so as to be pivotable about a spindle 76. The transport wheel 75 has a groove 77. A motor 78, whose shaft 78a carries a worm 79, is mounted on the bottom plate 6e of the housing 1. The motor 78 can be driven in two directions. By means of the worm 79 a toothed wheel 80 can be driven, which toothed wheel is rotatably mounted on a spindle 80a carried by the bottom plate 6e. The toothed wheel 80 is in mesh with a toothed wheel 81, which is rotatably mounted on the spindle 8 of the first pivotal arm 7. The toothed wheel 81 is in mesh with a toothed wheel 82, which is rotatably mounted on a spindle 82a on the first pivotal arm 7. The toothed wheel 82 meshes with a toothed ring 83 arranged on the transport wheel 75. Thus, the transport wheel 75 can be driven in two directions by means of the motor 78, the motor shaft 78a, the worm wheel 79, the toothed wheel 80, the toothed wheel 81 and the toothed wheel 82.

The geometrical dimensions of the groove 77 of the transport wheel 75 of the first guide and the groove 18 of the transport wheel 16 of the second guide are exactly the same. The transport wheel 75 of the first guide and the transport wheel 16 of the second guide are rotated in opposite directions with the same speed of rotation, as a result of which the information disc 2 is moved into and out of the apparatus without self-rotation.

The loading process from the eject position into the intermediate position and the roll-in position proceeds similarly to that in the first embodiment.

We claim:

1. A loading mechanism for loading and unloading an information disc into or from an information-technology apparatus, where the information disc has opposite first and second major surfaces substantially parallel each other, the first and second major surfaces being bounded by first and second edges respectively, and a circumferential rim surface extending between the first and second edges, the disc having a thickness defined between the first and second edges, wherein the mechanism comprises means for guiding and moving the information disc along a path in a loading plane, said means for guiding and moving comprising:

a first guide having a curved circumferential first groove, said first groove being arranged for engaging the first and second edges of the information disc during movement along the path, a second guide having an axis substantially perpendicular to said loading plane and a curved circumferential second groove, said second groove being arranged for engaging the first and second edges of the information disc during movement along the path, means for supporting said first guide and said second guide for movement in the loading plane transversely to the path, and means for rotationally driving the second guide about said axis during loading and unloading, so as to move the information disc along the path in the loading plane into and out of the apparatus, the first groove having an inclined first pressure face inclined relative to the loading plane, an opposed first pressure face, and a first circumferential bottom surface defining a minimum gap dimension, the minimum gap dimension being less than the thickness of the information disc, each of the first pressure faces engaging a respective one of said disc edges while the disc is being moved, the second groove having an inclined second pressure face inclined relative to the loading plane, an opposed second pressure face, and a second circumferential bottom surface defining a minimum gap dimension, the minimum gap dimension being less than the thickness of the information disc, each of the second pressure faces engaging a respective one of said disc edges while the disc is being moved, whereby, during movement along said path, the circumferential rim surface of the information disc is out of contact with the first and second circumferential bottom surfaces of the grooves.

2. A mechanism as claimed in claim 1, characterized in that said path is a substantially straight path.

3. A mechanism as claimed in claim 1, characterized in that said means for supporting said first guide and said second guide comprises a housing plate, a first arm pivotally mounted to said plate, and a second arm pivotally mounted to said plate, said first guide is formed as a segment carried on and pivoting with said first arm, and said second guide is rotatably mounted on said second arm, whereby the disc undergoes rolling self-rotation during movement along said path.

4. A mechanism as claimed in claim 1, characterized in that said first pressure faces define an included angle greater than the included angle defined by said second pressure faces.

5. A mechanism as claimed in claim 1, characterized in that said second guide is a circular transport wheel, said second pressure faces are second conical surfaces each inclined with respect to the loading plane, and said second circumferential bottom surface is a substantially cylindrical surface, said second conical surfaces and said substantially cylindrical surface defining a substantially U-shaped groove and being surfaces of revolution about said axis.

6. A mechanism as claimed in claim 5, characterized in that said first pressure faces are first conical surfaces each inclined with respect to the loading plane, said first conical surfaces and said first circumferential bottom surface defining a substantially U-shaped groove and being surfaces of revolution.

7. A mechanism as claimed in claim 6, characterized in that said first pressure faces define an included angle greater than the included angle defined by said second pressure faces.

8. A mechanism as claimed in claim 6, characterized in that the first and second guide grooves have the same geometric dimensions, the mechanism further comprises means for rotationally driving the first guide wheel at the same speed of rotation as said means for rotationally driving the second guide, in an opposite direction, thereby moving the information disc along said path without self-rotation.

9. A mechanism as claimed in claim 6, characterized in that during the loading procedure the information disc is clamped in the grooves of the first and second guides while rolling along the path.

10. A mechanism as claimed in claim 9, characterized in that in an eject position after outward movement along said path the information disc is clamped in the grooves of the first and second guides such that to pull the information disc out of the grooves by hand a user must exert a minimum force of 0.7 Newtons.

11. A mechanism as claimed in claim 9, characterized in that said first pressure faces each have an angle of inclination with respect to the loading plane in a range between 4° and 8°, and said second pressure faces each have an angle of inclination with respect to the loading plane in a range between 3° and 7°.

12. A mechanism as claimed in claim 9, characterized in that the pressure faces of said guides are made of respective materials having a modulus of elasticity greater than the modulus of elasticity of the information disc, and the pressure faces of said guides have such a roughness, and the means for supporting the guides urges the pressure faces against the information disc with such force, that a frictional engagement exists between the surface of the information disc and the pressure faces during movement along said path.

13. A mechanism as claimed in claim 12, characterized in that the basic material of the second guide is steel, and the steel is covered with a layer of chromium carbide at least at the location of the second pressure faces.

14. A mechanism as claimed in claim 12, characterized in that the basic material of the second guide is steel, and the steel is covered with a layer of tungsten-carbon-hydrogen at least at the location of the second pressure faces.

15. A mechanism as claimed in claim 12, characterized in that the basic material of the first guide is steel, and the steel is covered with a layer of chromium carbide or tungsten-carbon-hydrogen at least at the location of the first pressure faces.

16. A mechanism as claimed in claim 12, characterized in that the maximum surface roughness $R_t$ of the respective pressure faces lies in a range between 2 $\mu$m and 15 $\mu$m and the average arithmetic roughness $R_a$ lies in a range between 0.2 $\mu$m and 1.5 $\mu$m.

17. A mechanism as claimed in claim 12, characterized in that the basic material of the second guide is steel, and the steel is covered, at least at the location of the second pressure faces, with a layer of chromium carbide or tungsten-carbon-hydrogen deposited by a vapor-deposition process.

18. A mechanism as claimed in claim 12, characterized in that the basic material of the first guide is steel, and the steel is covered, at least at the location of the first pressure faces, with a layer of chromium carbide or tungsten-carbon-hydrogen deposited by a vapor-deposition process.

19. A deck having a loading mechanism for loading and unloading an information disc into or from the deck, where the information disc has opposite first and second major surfaces substantially parallel each other, the first and second major surfaces being bounded by first and second edges respectively, and a circumferential rim surface extending between the first and second edges, the disc having a thickness defined between the first and second edges, wherein the mechanism comprises means for guiding and moving the information disc along a path, said means for guiding and moving comprising:

a first guide having a curved circumferential first groove, said first groove being arranged for engaging the first and second edges of the information disc during movement along the path, a second guide having an axis substantially perpendicular to said loading plane and a curved circumferential second groove, said second groove being arranged for engaging the first and second edges of the information disc during movement along the path, means for supporting said first guide and said second guide for movement in the loading plane transversely to the path, and means for rotationally driving the second guide about said axis during loading and unloading, so as to move the information disc along the path in the loading plane into and out of the apparatus, the first groove having an inclined first pressure face inclined relative to the loading plane, an opposed first pressure face, and a first circumferential bottom surface defining a minimum gap dimension, the minimum gap dimension being less than the thickness of the information disc, each of the first pressure faces engaging a respective one of said disc edges while the disc is being moved, the second groove having an inclined second pressure face inclined relative to the loading plane, an opposed second pressure face, and a second circumferential bottom surface defining a minimum gap dimension, the minimum gap dimension being less than the thickness of the information disc, each of the second pressure faces engaging a respective one of said disc edges while the disc is being moved, whereby, during movement along said path, the circumferential rim surface of the information disc is out of contact with the first and second circumferential bottom surfaces of the grooves.

20. An information-technology apparatus including a deck having a loading mechanism for loading and unloading an information disc into or from the apparatus, where the information disc has opposite first and second major surfaces substantially parallel each other, the first and second major surfaces being bounded by first and second edges respectively, and a circumferential rim surface extending between the first and second edges, the disc having a thickness defined between the first and second edges, wherein the mechanism comprises means for guiding and moving the information disc along a path, said means for guiding and moving comprising:

a first guide having a curved circumferential first groove, said first groove being arranged for engaging the first and second edges of the information disc during movement along the path, a second guide having an axis substantially perpendicular to said loading plane and a curved circumferential second groove, said second groove being arranged for engaging the first and second edges of the information disc during movement along the path, means for supporting said first guide and said second guide for movement in the loading plane transversely to the path, and means for rotationally driving the second guide about said axis during loading and unloading, so as to move the information disc along the path in the loading plane into and out of the apparatus, the first groove having an inclined first pressure face inclined relative to the loading plane, an opposed first pressure face, and a first circumferential bottom surface defining a minimum gap dimension, the minimum gap dimension being less than the thickness of the information disc, each of the first pressure faces engaging a respective one of said disc edges while the disc is being moved, the second groove having an inclined second pressure face inclined relative to the loading plane, an opposed second pressure face, and a second circumferential bottom surface defining a minimum gap dimension, the minimum gap dimension being less than the thickness of the information disc, each of the second pressure faces engaging a respective one of said disc edges while the disc is being moved, whereby, during movement along said path, the circumferential rim surface of the information disc is out of contact with the first and second circumferential bottom surfaces of the grooves.

* * * * *